United States Patent [19]

Kronseder et al.

[11] 4,375,374
[45] Mar. 1, 1983

[54] METHOD AND APPARATUS FOR TRANSPORTING GLASS VESSELS

[75] Inventors: Hermann Kronseder, Worth; Karl Dullinger, Neutraubling, both of Fed. Rep. of Germany

[73] Assignee: Krones AG Hermann Kronseder Maschinenfabrik, Worth, Fed. Rep. of Germany

[21] Appl. No.: 236,093

[22] Filed: Feb. 20, 1981

[30] Foreign Application Priority Data

Feb. 21, 1980 [DE] Fed. Rep. of Germany ....... 3006490

[51] Int. Cl.³ .......................... B08B 3/04; B08B 9/00
[52] U.S. Cl. ...................................... 134/25.4; 134/32; 134/42; 134/60; 134/73; 134/133; 181/211; 198/342; 198/445; 198/493
[58] Field of Search ...................... 134/32, 42, 60, 73, 134/133, 25.2, 25.4; 198/342, 445, 493; 181/207, 211; 209/522

[56] References Cited

U.S. PATENT DOCUMENTS

| | | | |
|---|---|---|---|
| 2,350,020 | 5/1944 | Drake et al. | 198/493 X |
| 2,580,420 | 1/1952 | Griswold et al. | 134/73 |
| 2,681,872 | 6/1954 | McCabe | 134/60 X |
| 3,138,408 | 6/1964 | Bruce et al. | 198/493 |
| 3,951,158 | 4/1976 | Tedden | 134/60 |
| 4,093,066 | 6/1978 | Mitchell et al. | 181/200 X |
| 4,154,624 | 5/1979 | Wahl et al. | 134/73 X |
| 4,273,237 | 6/1981 | Wahl et al. | 198/445 |

FOREIGN PATENT DOCUMENTS 596512  2/1978  U.S.S.R. .............................. 198/445

*Primary Examiner*—Marc L. Caroff
*Attorney, Agent, or Firm*—Ralph G. Hohenfeldt

[57] ABSTRACT

In bottle transporting apparatus, noise resulting from bottles colliding with each other and noise emitted by the transport mechanism is suppressed by moving the bottles in a water bath which immerses the mechanism and at least partially immerses the bottles so the sound is absorbed and attenuated by the water. Means are provided for partially filling the bottles with liquid before they reach locations where noise would be generated and this further suppresses noise. Water jets are used to assist bottle movement where the bottles are transported on conveyors and the jets may be used as the sole propulsion force in apparatus wherein the bottles are simply pushed along smooth support surfaces.

10 Claims, 3 Drawing Figures

METHOD AND APPARATUS FOR TRANSPORTING GLASS VESSELS

BACKGROUND OF THE INVENTION

This invention relates to machinery for transporting vessels, especially glass bottles, in a bottling plant, for example.

There are various kinds of bottle transporting apparatus wherein bottles stand upright on the upper run of an endless hinge-band-chain or a group of such chains in parallel. The power-driven translating chains may be used to move vessels such as bottles between individual machines of a racking-plant or a bottling-plant. During transport, the stream of vessels is frequently deflected, accelerated, retarded, divided into groups and brought together. At places along the conveyor at which the foregoing events occur, the glass vessels have a tendency to pack or crowd and collide with each other which, particularly when empty bottles are being transported, results in development of a high noise level, caused by the continuous striking of the bottles against each other.

In some prior art bottle transporting apparatus, the places where colliding of the bottles and development of high noise levels is likely to occur are covered with a hood that is lined with an acoustic absorber. Although use of hoods lowers ambient noise level, observation and access of the bottles for overcoming disturbances becomes cumbersome and time-consuming.

SUMMARY OF THE INVENTION

A primary object of the present invention is to obtain a substantial reduction of the noise level associated with conveying bottles without interfering with accessibility.

Briefly stated, in accordance with the invention, the conveyor chains on which the bottles are transported are caused to run partially or completely under a liquid such as water such that the bottles are at least partly immersed in liquid at least in those zones along the transport route at which significant noise due to bottle collisions is likely to occur.

It was a surprise to discover that the bottles only had to be slightly immersed compared to their height to bring about a substantial reduction of sound emission regardless of whether two adjacent glass vessels or bottles struck one another in their lower or upper portions. By way of example, in a case where 0.5 liter Euro-bottles were being transported, it was discovered that an immersion depth or liquid level of 40 mm., in a liquid having the density of water, and where heavy bombardment was occurring, a reduction of the noise level by up to 12 dBA (decibels on the A scale). Another beneficial effect obtained is that sound emission caused by movement of the upright bottles on the conveyors is also greatly reduced.

It is most convenient to have the bottles partially immersed in water in the critical noise areas since water is readily available in bottling plants, is cost effective and has good sound-absorbing properties.

Since bottle conveying and washing equipment is invariably made of corrosion resistant materials, the sound-proofing liquid may be corrosive such as a solution of lye. Thus, the liquid performs the dual functions of sound suppression and cleaning of the exterior surfaces of the bottles.

In addition, the liquid can be heated for transferring heat to the glass vessels to prepare them for certain operations in a bottling plant where preheating is desirable.

A further feature and advantage of the invention is that the liquid that is accumulated for the purpose of partially immersing the bottles can be obtained from spray nozzles which direct liquid jets against the bottles to aid in moving them in the direction in which they are being conveyed. In fact, on some occasions, the jets of fluid may be used as the sole source for propelling the bottles along a stationary supporting surface while they are confined on their sides to maintain them in upright position.

As suggested earlier, an especially quiet conveyor system is obtained if the bottle-supporting surface is constituted by the upper run of at least one driven closed loop hinge-band-chain whose lower run is moving beneath the surface of the bottle-immersing liquid. In such case, the noise produced by the rapidly moving conveyor chains interacting with the sprockets that drive them will be dampened or reduced. In accordance with the invention, a noise suppressing bottle transport apparatus may be implemented where bottles are conveyed in a single row or in multiple rows along parallel paths in all noise-producing regions of the bottling plants. In any case, it is only necessary to provide a metal tank for accommodating the surface such as a conveyor chain on which the series of bottles are being transported. This implementation has been found to be particularly beneficial where a plurality of rows of bottles are being fed to a bottle cleaning machine.

How the foregoing objects and features and other more specific objects and features of the invention are achieved will be evident in the ensuing more detailed description of a preferred embodiment of the invention which will now be set forth in reference to the drawings.

DESCRIPTION OF THE DRAWINGS

Referring to FIG. 1, the bottles are introduced into that part of the apparatus which is depicted from the left end by way of a fragmentarily shown conveyor section 18. It will be evident in this embodiment that there may be five parallel adjacent rows or series of bottles entering the apparatus. The destination of the bottles is a bottle-washing machine which is shown schematically and designated generally by the reference numeral 2.

The bottles are pushed into the apparatus over a stationary plate 17 which is depicted at the left side of FIGS. 1 and 2. The first stage of the transport apparatus is comprised of five hinge-band-chains 6 and this group is designated generally by the numeral 3. Typical of other groups, hinge-band-chains 6 in group 3 run on idler wheels 7 and driven wheels 8 that are supported and guided in profile-frames 9 which can be seen in FIG. 3. In FIG. 1, a typical bottle is shown in the first stage and it is marked 1. Typically, this and other bottles in the series may be 0.5 liter Euro-bottles which are standing upright as they are being conveyed. Although they are not shown, the bands carried on the chains often have small cross bars which may tend to isolate the bottles in a series from each other. The manner in which the conveying band-chains 3 are collectively declined from horizontal can be seen particularly well in FIG. 2.

Figure 1:
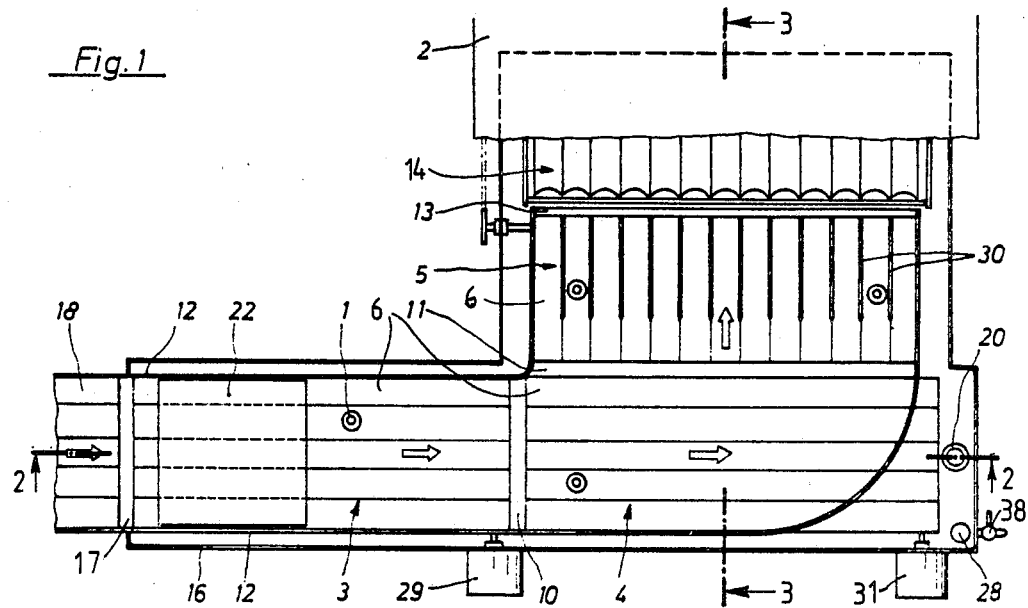
FIG. 1 is a plan view of apparatus for transporting vessels such as glass bottles.
Figure 2:
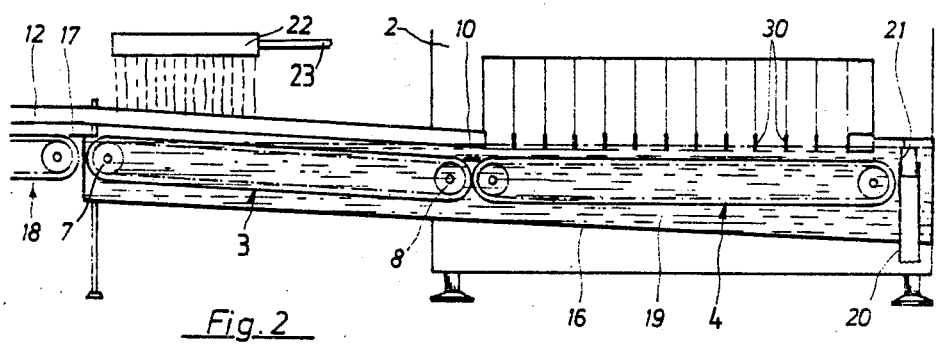
FIG. 2 is a vertical section taken generally on a line corresponding with 2-2 in FIG. 1.

As can be seen in FIGS. 1 and 2, bottles are transferred from the first conveyor stage to the next one, comprised of five band-chains 4. Because of their similarity to the band-chains in group 4, group 5 bands are also given the reference numeral 6. As can be seen particularly well in FIG. 3, band-chains in group 4 have their upper and lower runs disposed horizontally in the illustrated embodiment. Motors 29, 31 drive the chains.

A third group of hinge-band chains is designated generally by the reference numeral 5 and is comprised of individual hinge-band-chains which are again designated by the reference numeral 6. The hinge-band-chains in group 5 are orthogonal to those in group 4 and it will be evident that this change of direction affords an opportunity to distribute bottles from only five individual paths in group 4 to a larger number of hinge-band-chains for the bottles to proceed toward the washing machine. The interchange from the hinge-band-chain group 4 to group 5 occurs over a stationary plate 11 in FIG. 1 on which the bottles that have accumulated as a result of a change of direction simply slide.

Side rails for guiding the bottles on the hinge-band-chains are indicated to be present by the reference numeral 12.

Figure 3:
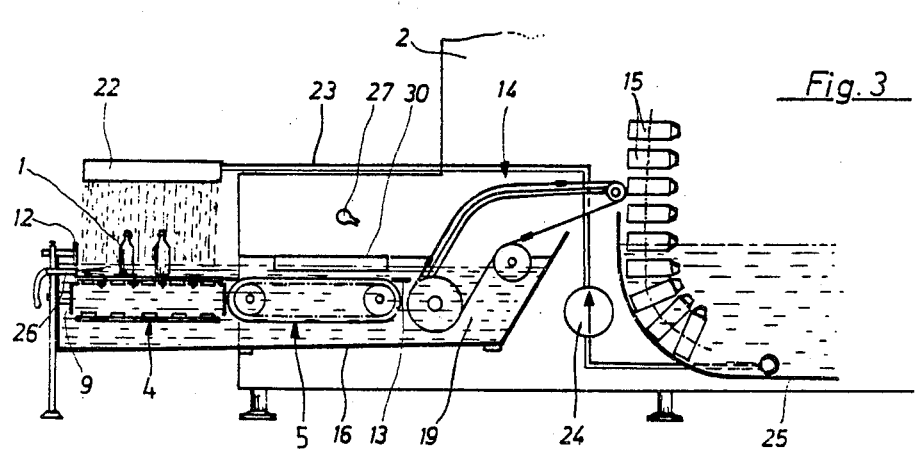
FIG. 3 is a vertical section taken on a line corresponding generally with 3-3 in FIG. 1.

As can be seen in FIG. 3 particularly well, the third group 5 of hinge-band-chains 6 also move in a horizontal plane. At the output side of this part of the conveyor there is another stationary slide-plate 13 over which the bottles slide toward the next stage 14 which comprises a conveyor for changing the attitude of the bottles in each series from upright or vertical to horizontal as is evident in FIG. 3.

The three groups 3, 4 and 5 of the hinge-band-chains 6 as well as the lower area of the level-conveyor 14 are surrounded by a metal tank 16 that is open at the top and which is formed, along opposite sides of all of the chain groups 3, 4 and 5 and the slide-plates 10, 11 and 13 and the space between the sides of the tank 16 is slightly wider than the overall width of the rows of chains. The upper rim of metal tank 16 terminates above the horizontal area of the bottle-supporting surfaces on the band-chains or at the level of the upper end of the inclined group 3 as is evident in the left portion of FIG. 2. Thus, incoming bottles standing upright on input conveyor 18 pass over stationary plate 17 and move on to inclined chain group 3. The metal tank 16 contains a liquid bath 19, ususally consisting of water, whose surface lies at about 40 mm. above horizontally disposed chain groups 4 and 5 and slide plates 10, 11 and 13. These components are, thus, completely immersed while the inclined chain group 3 is immersed only from about its midpoint to its lower end as can be seen in FIG. 2. The hinge-band-chains 6 of the second horizontal group 4 and the horizontal group 5 and their guide-wheels 7, drive-wheels 8, profile-frames 9, for instance, lie completely under the surface of the liquid 19 while the hinge-band-chains 6 of the first group 3 and level-conveyor 14 have only their lower part immersed in liquid 19. Thus, the liquid wets the bottles which are disposed in the horizontal transport area to a level of about 40 mm.

To control the level of the liquid 19, there is provided in the inclined bottom of metal tank 16 an overflow pipe 20 which may discharge to a sewer, not shown. The upper end of overflow pipe 20 is provided with a telescoping pipe 21 which can be moved up or down to set the level of the fluid in tank 16.

In addition, a continuous supply of liquid is delivered from a spray box 22 which spreads liquid over the entire breadth of the first group 3 of the hinge-band-chains 6. The spray box 22 of course has a perforated bottom and is arranged above the path of movement of bottles 1. Spray box 22 is fed with liquid by means of a conduit 23 that leads to a pump 24. Pump 24 draws fluid from a tank 25 which is part of the bottle-washing machine. This fluid is discharged from spray box 22 and is used for presoaking bottles before they enter the bottle-washing machine. The fluid in tank 25 may consist of water in which a small amount of lye is dissolved. Typically, the lye solution is held at about 40° C.

At the lowest point of the inclined bottom of metal tank 16, there is provided a drain hole 28 that is controlled by a valve 38 for completely draining the tank such as is required for cleaning it.

As indicated earlier, transport of the bottles can be assisted by projecting jets of water against them in the direction in which it is desired that the bottles move. This is especially useful where series of bottles in different rows are simply being pushed along by the force of bottles behind them. As can be seen in FIG. 3, a set of spray nozzles 26 are provided below the surface of liquid 19 for urging the bottles to change direction from one conveyor stage to another and there is a set of spray nozzles 27 above the group 5 hinge-band-chains for assisting in transport. Nozzles 26 and 27 may, of course, be supplied from the output side of pump 24 although the conduits connecting them to the pump are not shown. Especially in the case of a single-row bottle transport arrangement, it is possible to bring about movement of the bottles exclusively through the use of the spray nozzles so that the bottles simply have to move on a smooth stationary band or surface.

Operation of the bottle-transporting apparatus is as follows: the empty bottles 1 coming in at the left of the illustrated apparatus are gradually lowered on the first group 3 of hinge-band-chains 6 until they are partially immersed to a predetermined level such as about 40 mm. for 0.5 liter bottles. At the same time, the bottles are bombarded by the spray from spray head 22 with hot water which partially enters the bottles and soaks the contaminants. The water that gets into the bottles from spray head 22 serves as a ballast for increasing the stability of the bottles and for additional sound absorption. Besides, this sprayed water heats the bottles which is beneficial to the washing process which is performed in the bottle-cleaning machine 2. The immersed bottles taken over from the first group 3 of hinge-band-chains 6 by the second group 4 and arrive in an accumulated form at the input to the bottle-washing machine 2 particularly in front of the guide partitions 30 in FIG. 1. Because of the partial immersion of the bottles in the liquid 19, emmission of sound resulting from the bottles striking one another is relatively slight. The bottles travel further over the third group 5 of hinge-band-chains 6 to level-conveyor 14 where the impact of the bottle bottom against conveyor 14 is also dampened and quieted or, stated in another way, the sound is absorbed in the liquid. The liquid 19 is continuously replenished by means of spray head 22 with fluid obtained from the presoaker tank 25 of the bottle-cleaning machine 2 and, accordingly, the bottles are held at temperature by fluid which would normally flow off from the presoaker tank 25 unused.

Although an implementation of the basic concepts of the invention has been described in detail, such description is intended to be illustrative rather than limiting, for the invention may be variously embodied and is to be limited only by interpretation of the claims which follow.

We claim:

1. In an apparatus wherein glass vessels are transported on a conveyor means while being free to strike each other, the improvement consisting essentially of:

tank means for being occupied by a liquid comprised of a selected one of water or water having a substance dissolved in it up to a predetermined level, means for maintaining the liquid in said tank means at said predetermined level, hinge-band-chain conveyor means in the tank means having an upwardly presented surface for supporting in an upright-standing attitude a series of glass vessels so that said vessels are free to strike each other after having been deposited thereon and means for translating said surface in a closed loop for advancing said glass vessels through the tank means, said supporting surface being positioned sufficiently below the upper level of the liquid for said vessels to be at least partially but not totally immersed in said liquid for said liquid to absorb sound that is produced by the glass vessels striking each other.

2. The apparatus as in claim 1 wherein:

said hinge-band-chain conveyor means has upper and lower translating runs, one end of the upper run which provides said upwardly presented surface being higher than the other end of said run, at least said other end being below the liquid level in said tank means, said tank means having a top opening to permit said glass vessels to be deposited on said one higher end for being translated into said liquid.

3. The apparatus defined in any of claims 1 or 2 including:

nozzle means for projecting a stream of liquid against said vessels in the direction in which the vessels should move to thereby assist their advancement.

4. In an apparatus wherein glass vessels are transported on a conveyor means while being free to strike each other, the improvement consisting essentially of:

conveyor means for transporting a series of said glass vessels along a predetermined path while said vessels are standing upright on said conveyor means and are free to collide with each other, container means in which said conveyor means is disposed, said container means being for containing a liquid up to a predetermined level and having input means for enabling vessels to be transferred to said conveyor means and output means for transferring vessels from said conveyor means, means for maintaining the liquid in said container means at said predetermined level, said conveyor means comprising a closed loop power driven flexible means having an upper translating run providing a planar surface on which the vessels stand and a lower translating run, said loop declining in a direction away from said input means toward said output means of the container such that at least the lower portion of said upper run is positioned below the level of said liquid so that said vessels are partially immersed in liquid which absorbs sound caused by striking of the glass vessels.

5. The apparatus defined in claim 4 including means near said input means for spraying liquid into said vessels for increasing the stability of said upright vessels on said means for transporting and for said sprayed liquid to augment sound absorption.

6. The apparatus defined in claim 4 including:

nozzle means for projecting a stream of liquid against said vessels in their direction of transport to thereby assist their transport in said path.

7. The apparatus defined in claim 4 including:

a vessel-washing machine having input means for vessels and a recess for collecting liquid used in the machine, means for transferring vessels from the output means of said container means to the input means of said washing machine, and nozzle means adjacent the output means of the container means, said nozzle means being below the surface of the liquid in said container means and being positioned to project liquid against the vessels in the direction of transfer for urging the vessels toward the washing machine.

8. The apparatus defined in claim 7 including:

a pump having input means for drawing liquid from said recess of the washing machine and having output means, spraying means having input means coupled to the output means of said pump and having output means for spraying liquid into said vessels for increasing the stability of said vessels during transport and for augmenting absorption of sound.

9. A method of transporting a series of upstanding colliding glass vessels in a manner that reduces noise resulting from collisions comprising transporting said glass vessels in an upright standing attitude so that said vessels are free to strike each other while keeping said vessels partially immersed in a sound-absorbing liquid during transport.

10. The method set forth in claim 9 including inserting some liquid into said vessels for augmenting absorption of sound and thereby adding weight near the bottoms of the vessels for stabilizing said vessels during transport.

* * * * *